(12) United States Patent
Sen et al.

(10) Patent No.: US 11,748,797 B2
(45) Date of Patent: Sep. 5, 2023

(54) SYSTEM AND METHOD FOR PROVIDING RECOMMENDATIONS TO A TARGET USER BASED UPON REVIEW AND RATINGS DATA

(71) Applicant: The University of Tulsa, Tulsa, OK (US)

(72) Inventors: Sandip Sen, Tulsa, OK (US); Osman Yucel, Santa Clara, CA (US)

(73) Assignee: THE UNIVERSITY OF TULSA, Tulsa, OK (US)

( * ) Notice: Subject to any disclaimer, the term of this patent is extended or adjusted under 35 U.S.C. 154(b) by 428 days.

(21) Appl. No.: 16/485,328

(22) PCT Filed: Feb. 15, 2018

(86) PCT No.: PCT/US2018/018419
§ 371 (c)(1),
(2) Date: Aug. 12, 2019

(87) PCT Pub. No.: WO2018/152362
PCT Pub. Date: Aug. 23, 2018

(65) Prior Publication Data
US 2019/0378193 A1    Dec. 12, 2019

Related U.S. Application Data

(60) Provisional application No. 62/459,968, filed on Feb. 16, 2017, provisional application No. 62/459,999, filed on Feb. 16, 2017.

(51) Int. Cl.
*G06Q 30/00* (2023.01)
*G06Q 30/0601* (2023.01)
*G06Q 30/0282* (2023.01)
*H04L 67/306* (2022.01)
*G06N 20/00* (2019.01)

(52) U.S. Cl.
CPC ..... *G06Q 30/0627* (2013.01); *G06Q 30/0282* (2013.01); *G06Q 30/0631* (2013.01); *H04L 67/306* (2013.01); *G06N 20/00* (2019.01)

(58) Field of Classification Search
CPC . G06Q 30/0631; G06Q 30/0601–0645; G06Q 30/0627; G06Q 30/0282; H04L 67/306
See application file for complete search history.

(56) References Cited

U.S. PATENT DOCUMENTS 8,108,255 B1    1/2012  Robinson et al.
9,552,399 B1 *  1/2017  Browning ............ G06Q 50/01
(Continued)

OTHER PUBLICATIONS

"Li, Chen, Recommender systems based on user reviews: the state of the art, © Springer Science+Business Media Dordrecht, 2015" (Year: 2015).*
(Continued)

*Primary Examiner* — Kathleen Palavecino
(74) *Attorney, Agent, or Firm* — McAfee & Taft

(57) ABSTRACT

A method and system for recommending online content based upon the predictive value of reviews provided by third party reviewers correlated to the identity of those reviewers. The correlated data is used to predict how a target user would rate an unrated item, and to make recommendations to the target user.

31 Claims, 9 Drawing Sheets

(56) References Cited

U.S. PATENT DOCUMENTS

2015/0186790 A1* 7/2015 Ehlen .................. G06Q 30/02
                                                    707/750
2017/0041467 A1  2/2017 Jandwani
2017/0061286 A1* 3/2017 Kumar ............... G06Q 30/0269

OTHER PUBLICATIONS

"CWK Leung, Integrating collaborative filtering and sentiment analysis: A rating inference approach, Proceedings of the ECAI 2006 workshop on recommender systems, 62-66" (Year: 2006).*
International Search Report and Written Opinion of the International Searching Authority dated Mar. 30, 2018 issued in corresponding PCT Application No. PCT/US2018/018419.

* cited by examiner

Web Site Reviews for Item 1

Reviewer A : Fast moving, suspenseful

Reviewer B : Not believable.

Reviewer C : Exciting

Target : [Purchased, "Thumbs Up" rating]

FIG. 2

Web Site Reviews for Item 2

Reviewer A : Suspenseful

Reviewer B : Exciting

Reviewer C : Good movie !

Target : [Purchased, "Thumbs Down" rating]

FIG. 2B

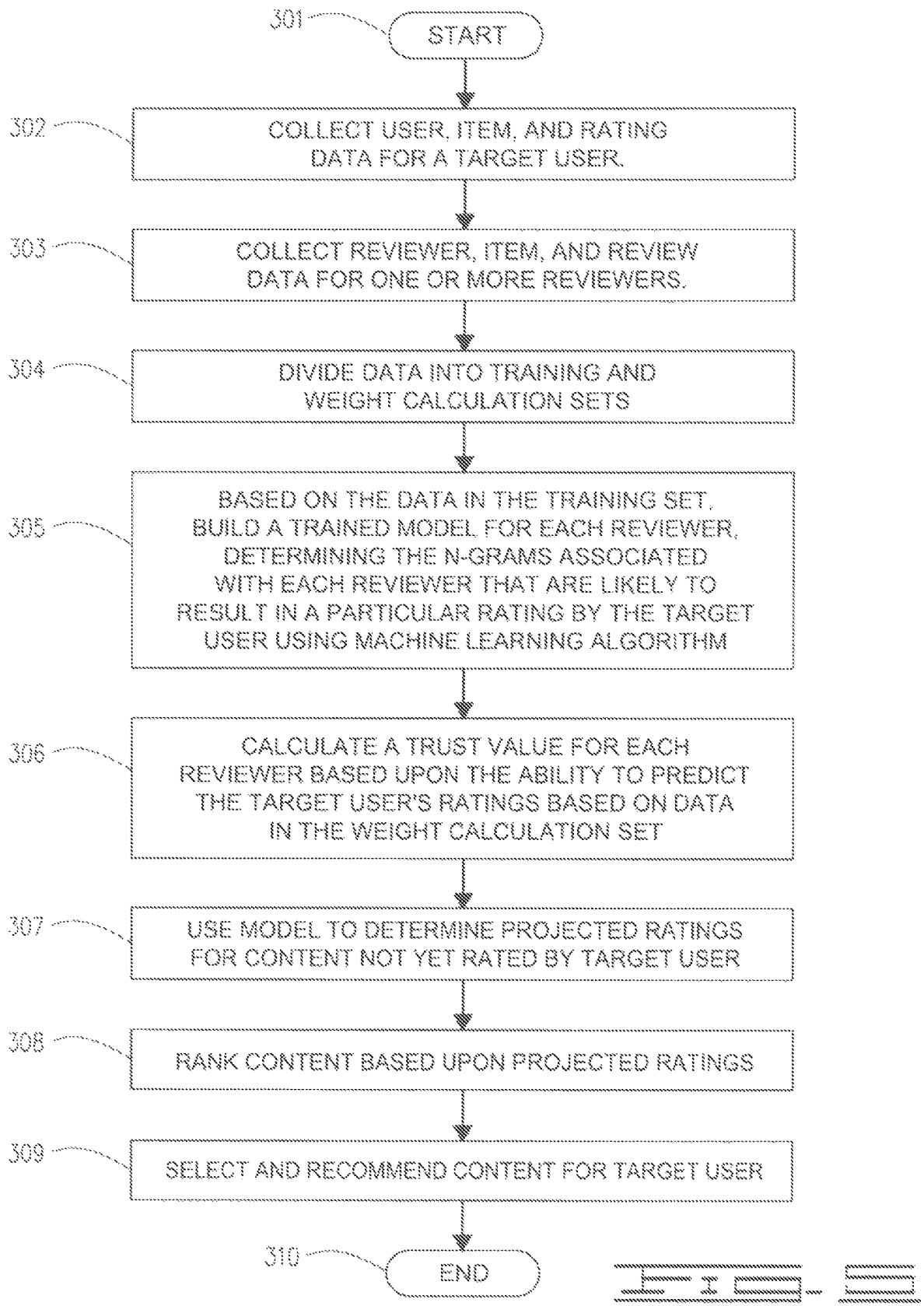

```
Data: Items, Users, (Item-User-Review-Rating) quadruples, Target User
Result: A list of recommended items
While: Target User has more items do
    combined Text ← "";
    Item i ← Target User's next item;
    while i has more reviews do
        review r ← next review for i;
        foreach word w in r do
            | combinedText.append(w&reviewerID(r));
        end
    end
    combinedText.label ← TargetUser's rating for i;
    TrainingSet.add(combinedText);
end
Train Classifier with TrainingSet;
foreach item j not rated by TargetUser do
    combined Text ← "";
    while j has more reviews do
        review r ← next review for j;
        foreach word w in r do
            | combinedText.append(w&reviewerID(r));
        end
    end
    j.predictedRating ← Classifier.predict(combinedText);
end
Recommend Items based on their predicted ratings;
                        Algorithm 1: RWP Approach
```

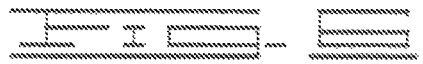

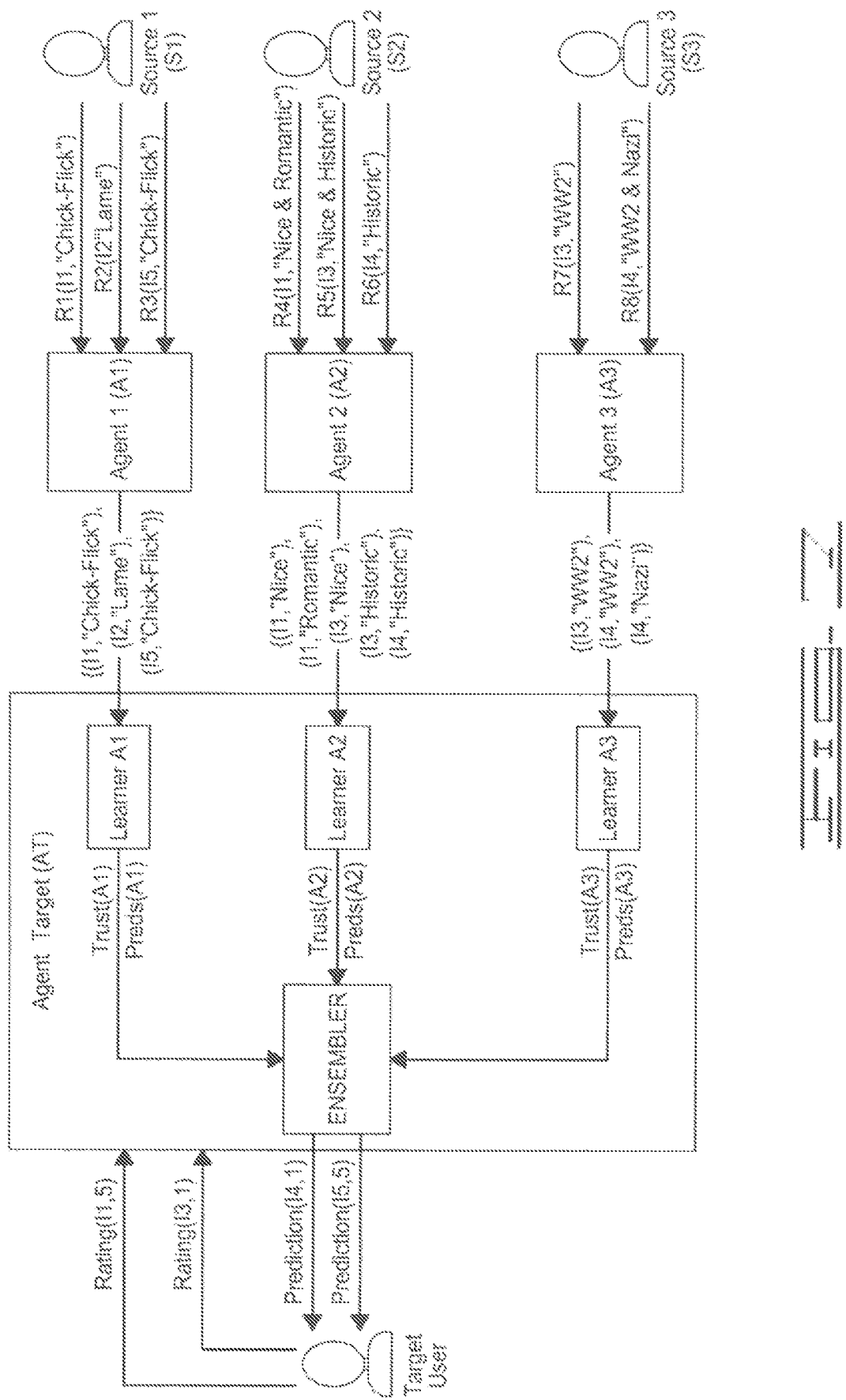

SYSTEM AND METHOD FOR PROVIDING RECOMMENDATIONS TO A TARGET USER BASED UPON REVIEW AND RATINGS DATA

CROSS-REFERENCE TO RELATED APPLICATIONS

This application claims priority from U.S. Provisional Patent Application Ser. No. 62/459,968, entitled SYSTEM AND METHOD FOR PROVIDING RECOMMENDATIONS TO A TARGET USER BASED UPON REVIEW AND RATINGS DATA, filed Feb. 16, 2017, and 62/459,999, entitled SYSTEM AND METHOD FOR PROVIDING RECOMMENDATIONS TO A TARGET USER BASED UPON REVIEW AND RATINGS DATA, filed Feb. 16, 2017, the entire contents of which are incorporated herein by reference.

FIELD

The present disclosure relates generally to the field of computing, and more particularly to product recommendation systems.

BACKGROUND

The internet provides vast, varied, and dynamic content to users. Although the ever-increasing content available on the internet provides the opportunity for users to locate and utilize products tailored to their unique interests and needs, the amount of content available also impairs users' abilities to meaningfully review and explore the products available to them. As a result, there is a need for accurate product-recommendation systems that identify products relevant to a particular user.

Recommendation systems are information processing systems that analyze data to predict the preferences of a particular user or users. A variety of systems and methods for recommending products to target users exist, including, for example, peer-to-peer recommendation systems, ratings-correlation systems, and predictive models that correlate rating data with item data and/or review data. Each of these systems suffers from drawbacks. For example, peer-to-peer recommendation systems, in which a user recommends a product or products to a target user, provide personalized recommendations to a target user, but the accuracy of these recommendations depend upon the recommender's knowledge of the target user, and it can be difficult to incentivize users to provide recommendations to target users. Other systems compare the ratings provided by a target user to the ratings of another user, and, where the ratings correlate, provide recommendations to the target user based upon the preferences of the correlated user. However, these systems cannot take into account the myriad reasons why two independent users might rate a product highly, and, as a result, the trust value associated with these systems is limited.

A more recent trend is to determine which words—e.g., "action," "suspense," "drama"—in collected user reviews are predictive of the target user's ratings, and to predict how the target user would rate an unrated product based upon the presence or absence of those words in user reviews associated with the unrated product. While such systems overcome some of the drawbacks of the peer-to-peer and ratings-correlation systems, these systems suffer from their own drawbacks. For example, the word "action" may be used differently by one recommender, User A, than it is by User B, such that User A's use of that term might be predictive of a target user's rating, while the use of the same word by User B may not be predictive. Further, these systems are language-dependent and grammar-dependent, in that an analysis of the predictive value of the word "exciting" would not include the Spanish translation of that word, "emocionante," nor would it include a misspelling, such as "existing," even if a particular user misspelled the term in a consistent way. Thus, these systems tend to exclude valuable information, including foreign-language reviews and misspelled terms that may be predictive of a target user's preferences. Although some systems attempt to remedy this defect with programming that identifies common equivalents and/or misspellings of words, this remedy is limited in scope, and cannot identify all misspellings and equivalents of the terms under consideration.

SUMMARY

A computer-implemented system and method for recommending products to a target user based upon the rating history of the target user and the reviews provided by one or more reviewers is disclosed. The system and method described herein may be utilized to recommend a wide range of products, including but not limited to books, movies, music, articles, websites, blogs, videos, advertisements, authors, commentary, hotels, vacations, professional services, and other products, goods, items, services, content and information that may be available for rent or purchase or otherwise provided or recommended online.

In the fields of computational linguistics and probability, an n-gram is a contiguous sequence of n items from a given sequence of text or speech. It is understood to those skilled in the art that the term "n-gram" encompasses, among other things, phonemes, syllables, letters, words, base pairs, or combinations of the aforementioned items. The computer-implemented system and method described herein provides the capability of determining whether a particular n-gram, as used by a particular reviewer, is predictive of the preferences of a particular target user. For example, according to some implementations of the disclosed subject matter, the computer-implemented system and method may include identifying a target user; identifying a set of data, including ratings provided for one or more products rated by a target user, reviews for the rated product(s) by one or more reviewers, reviews by one or more reviewers for a product or products that have not been rated by the target user, and information pertaining to the identity of the reviewers: correlating the n-grams contained in the reviews with the identity of the corresponding reviewers: training a classification or prediction model using the correlated n-gram/reviewer identities and the ratings provided by the target user; and using the classification or prediction model to provide a predicted rating for one or more unrated products. The computer-implemented system and method described herein has the advantage of being language-independent, and being capable of leveraging the full predictive value of a review without requiring specialized programming directed at identifying equivalent spellings, misspellings, and translations.

BRIEF DESCRIPTION OF THE DRAWINGS

These and other features of the disclosed system and method are herein described by reference to the drawings summarized below. These drawings and the associated descriptions are illustrative and are not intended to limit the scope of the presently disclosed systems, methods and techniques.

FIGS. 2a and 2b illustrate hypothetical data that may be collected using text-mining, data-storage, or other methods for purposes of determining the predictive value of n-grams used by various reviewers.

FIG. 5 is a simplified flowchart of another illustrative method for recommending products to a target user based upon the rating data of the target user and the reviews provided by reviewers.

FIG. 6 is the programmatic illustration of the exemplary machine-learning regression algorithm, which was presented in FIG. 4, that may be used to determine which n-grams used by a particular reviewer are predictive of the ratings provided by the target user, based upon the data in the training set.

FIG. 7 further illustrates certain of the steps described in the illustrative method set forth in FIG. 5.

DETAILED DESCRIPTION

A computer-implemented system and method for recommending products to a target user based upon the rating history of the target user and the reviews provided by other reviewers is disclosed, including specific implementations thereof. As will be recognized by those skilled in the art, the disclosed method can be used to recommend a wide range of products, including but not limited to content, services, products and other electronically distributed items, books, movies, music, articles, websites, blogs, videos, advertisements, authors, content providers, commentary, hotels, vacations, professional services, and other goods, items, services, data, and information that may be available for rent or purchase or provided or recommended online or otherwise distributed through public and private networks.

The system and method disclosed can provide recommendations to a wide range of target users, based upon reviews provided by a wide range of reviewers. As will be understood by those skilled in the art, the terms "user" and "reviewer" are not limited to individual persons, but can refer to any uniquely identifiable source of rating or review data, including but not limited to individuals, entities, blogs, websites, etc. Those skilled in the art will further understand that the term "review" is not limited to a formal review of an item, but can encompass a wide range of online or network based data, including but not limited to articles, blog entries, news articles, written assessments, item descriptions, or any other collection of n-grams affiliated with an identifiable source.

Although reference may be made to particular implementations, these implementations are provided only as illustrations of the claimed systems and methods, which may be embodied in various forms. The illustrative embodiments should not limit, and are not intended to limit, the scope of the appended claims. Specific details of the illustrative implementations that are well-known and understood to those skilled in the art may be omitted to avoid unnecessarily obscuring the illustrative implementations.

The present disclosure and the disclosed implementations are related to the field of product-recommendation systems, and the present disclosure describes exemplary embodiments of a computer-implemented system and method for recommending products to a target user. As discussed herein, the various embodiments of the present disclosure have the capacity to improve upon existing recommendation systems known and used in the field of computing and, more specifically, computer-implemented recommendation systems by correlating reviewer identities and review products, and using that correlated data to determine how online or other products would be rated by a target user.

Figure 1:
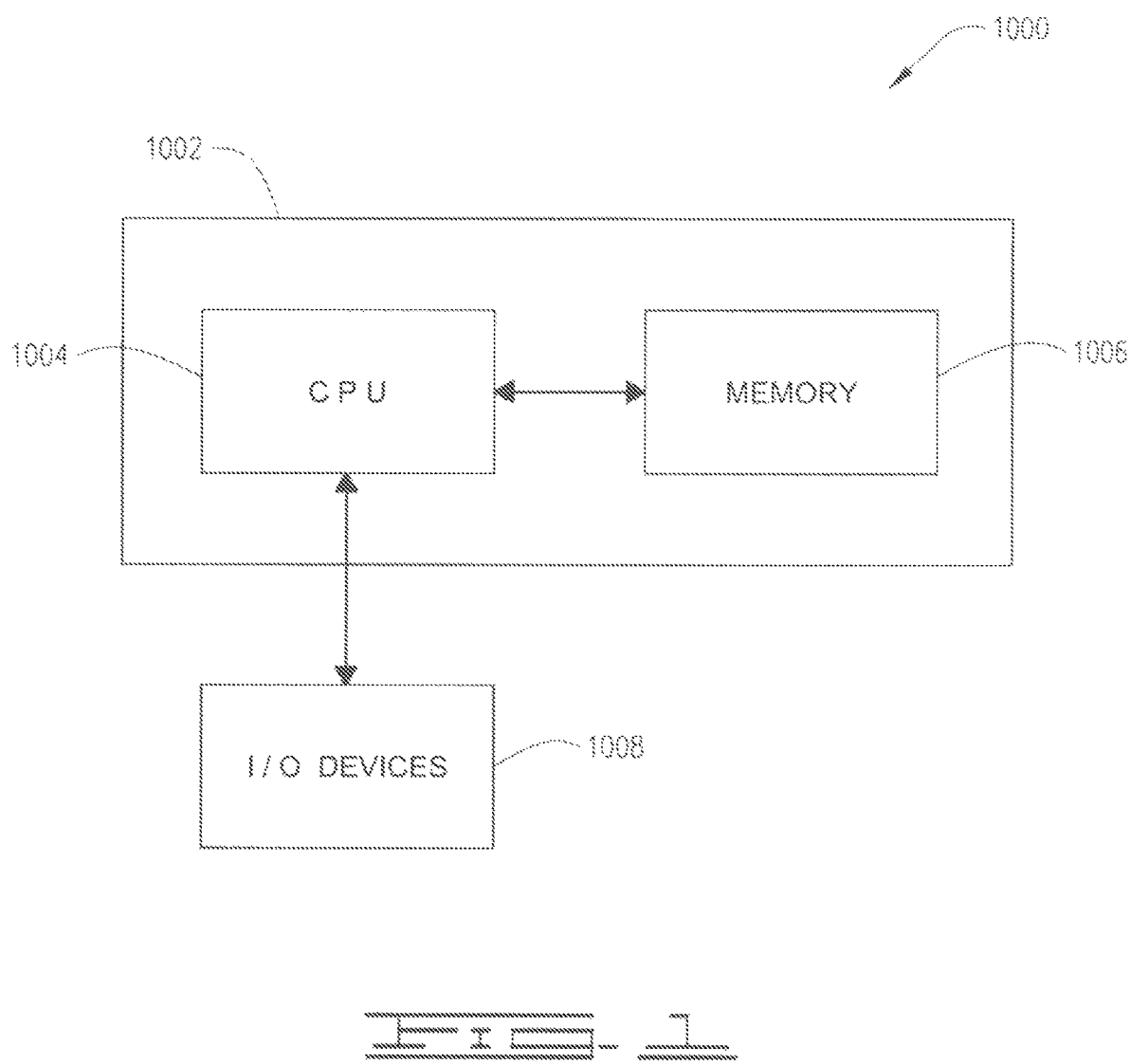
FIG. 1 illustrates a computing system. 1000, suitable for implementing and performing the methods and techniques for recommending products to a target user based upon the rating history of the target user and the reviews provided by reviewers.

FIG. 1 is a block diagram for a computing system 1000 suitable for implementing and performing the methods and techniques for recommending products to a target user based upon the rating history of the target user and the content of reviews provided by reviewers as described herein. It is understood that this is a simplified diagram of a system capable of implementing and performing the methods and techniques disclosed herein, and that those skilled in the art could readily utilize alternative configurations to implement the disclosed methods and techniques. Computing system 1000 includes a computing device 1002 operably connected to one or more input/output (I/O) devices 1008. Computing device 1002 is representative of various forms of computing devices, including desktops, laptops, workstations, servers, mobile devices, such as personal digital assistants, tablets, smart-phones, cellular telephones, and other similar computing devices.

Computing device 1002 includes a central processing unit (CPU) 1004. CPU 1004 includes one or more processors reading and/or executing instructions, programs, and applications stored in memory 1006 and computer-readable storage media of I/O devices 1008, and accessing and/or storing data in memory 1006 and computer-readable storage media of I/O devices 1008. CPU is operably connected with memory 1006. CPU 1004 is also operably connected with I/O devices 1008 through an applicable interface component for the corresponding I/O device 1008, e.g. port (serial, parallel USB), wire, card (sound, video, network), or the like. Exemplary types of CPU 1004 may include general purpose processors, digital programmable devices, microcontrollers, digital signal processors (DSPs), application specific integrated circuit (ASIC), and field programmable gate array (FPGA), or other components and combinations thereof designed to perform the functions described herein.

Memory 1006 includes data storage, volatile memory, e.g. random access memory (RAM), and non-volatile memory, e.g. read only memory (ROM).

I/O devices 1008 include various devices that a user may use to interact with the computing device 1002. Representative I/O devices 1008 include keyboards, touchscreens, mouse and other pointing devices; a visual display device, such as a cathode ray tube, liquid crystal display, screens, and other suitable display devices for visually communicating and interacting with the user: audio devices, such as a microphone, headphones, speakers; and print devices for printing, scanning, faxing, and/or transmitting data and images. I/O devices 1008 may also include computer-readable storage media, e.g. mass storage devices, disks, magnetic disks, optical disks, magnetic tape, flash memory, RAM, ROM. EEPROM, or any other media that can be used to carry or store computer-readable information. I/O devices 1008 may also include a communication device for connecting computing system 1000 with one or more other computing systems over a network, e.g. wired and/or wirelessly, utilizing one or more communications protocols, e.g. IEEE 802.11, IEEE 802.3, TCP/IP, cellular protocols, any other communications protocols, and combinations thereof.

System 1000 may include one or more I/O devices 1008 of the same type or of different types and combinations thereof and one or more computing devices 1002 of the same type or of different types and combinations thereof operably connected to each other.

The functions, methods, or algorithms described herein may be implemented in hardware, software, firmware, or any combinations thereof. When implemented in software, the described method may be stored in memory, computer-readable storage media, and/or combinations thereof and transmitted as one or more instructions or code to cause CPU 1004 to operate in accordance with the methods and teachings of the present disclosure. The operable connection of the various components of computing system 1000 described in reference to FIG. 1 include via buses, circuitry, wires, wireless, or other similar connections. The functions, methods, and techniques described herein may be implemented by one or more computing system in cooperation with each other. The components of system 1000 shown and described, including their relationships and functions, are exemplary and are not to limit the implementation of the system, methods, and techniques described herein.

The software containing the instructions and program for implementing the described methods and techniques may be stored locally in the computing device's memory, stored remotely on a mass storage device, and/or stored in the memory of a remote computing device.

The system and method described herein focuses on determining the predictive value of the n-grams used by a particular reviewer or reviewers, $R_1$ through $R_N$, for the ratings attributed by a target user, T. and utilizing the predictive reviewer/n-gram pairings to recommend products to target user T. As used herein, "product" is not limited to a tangible item, but can include anything provided, recommended, or made available online (including items for purchase, rent or use, services, online content, information, data, and content providers such as authors, artists, users, websites) to a target user. As used herein, a "review" is not limited to a formal review of a particular item, but includes any written commentary corresponding to a product. Similarly, a "rating" is not limited to a numerical rating, but encompasses any other forms of data indicative of preference, including binary yes/no or favorable/unfavorable ratings, as well as purchase/no-purchase, access/no-access and click-through history of a particular target user. Further, the terms "user" and a "reviewer" include individuals as well as any other identifiable sources, including but not limited to entities, websites, blogs, etc.

FIGS. 2a and 2b are illustrative of certain types of data that can be utilized by the disclosed system for purposes of generating recommendations to a target user, Target T. As illustrated in FIG. 2a, Reviewer A. Reviewer B, and Reviewer C have provided reviews on a website for Item 1, while Target T has provided rating data for Item 1 in the form of both a Purchase and a "Thumbs Up" rating. FIG. 2b illustrates that Reviewer A, Reviewer B and Reviewer C have also provided reviews on a website for Item 2, while Target T has provided rating data for Item 2 in the form of both a purchase and a "Thumbs Down" rating. In Table 1, the n-grams from FIGS. 2a and 2b are correlated with the identities of the reviewers who used the n-gram, and the reviewer/n-gram pairings are determined to be predictive (or not predictive) of the ratings of Target T. For example, Reviewer A has described both Item 1 and Item 2 as "suspenseful," as demonstrated by FIGS. 2a and 2b, and the n-gram "suspenseful" as used by Reviewer A is predictive of Target T's purchase of the item, but is not predictive of a "Thumbs Up" rating by Target T. However, because Reviewer A used the n-gram "fast moving" only in reference to Item 1, that n-gram, as used by Reviewer A, is predictive of a "Thumbs Up" rating by Target T for purposes of this simplified model.

FIGS. 2a, 2b and Table 1, below, further illustrate how the disclosed system and method utilizes reviewer/n-gram pairings, rather than unaffiliated n-grams.

TABLE 1

| User | N-Gram | Predictive of Purchase by T? | Predictive of Thumbs Up for T? |
|---|---|---|---|
| User A | Fast moving | Y | Y |
| User A | Suspenseful | Y | N |
| User B | Not believable | Y | Y |
| User B | Exciting | Y | N |
| User C | Exciting | Y | Y |
| User C | Good movie! | Y | N |

As depicted in FIG. 2a, 2b and Table 1, Reviewer C has used the n-gram "Exciting!" in reference to Item 1, which received a "Thumbs Up" rating by Target T, while Reviewer B used a similar n-gram, "Exciting" to describe Item 2, which received a "Thumbs Down" rating by Target T. Independent of any correlation to the reviewer's identity, the n-gram "exciting" is not predictive of a "Thumbs Up" or "Thumbs Down" rating by Target T in this simplified model. However, when the n-gram "Exciting" is correlated with reviewer identity, it is determined that, with respect to at least the limited data in exemplary FIGS. 2a & 2b and exemplary Table 1, the n-gram "Exciting" is predictive of a "Thumbs Up" rating when used by Reviewer C, but is predictive of a "Thumbs Down" rating when used by Reviewer B, while the n-gram "Exciting" is predictive of a "purchase" decision by Target T when used by either Reviewer B or Reviewer C. It is understood that the introduction of additional data will necessitate a more complex analysis than the binary approach presented in exemplary FIGS. 2a & 2b and exemplary Table 1.

Figure 3:
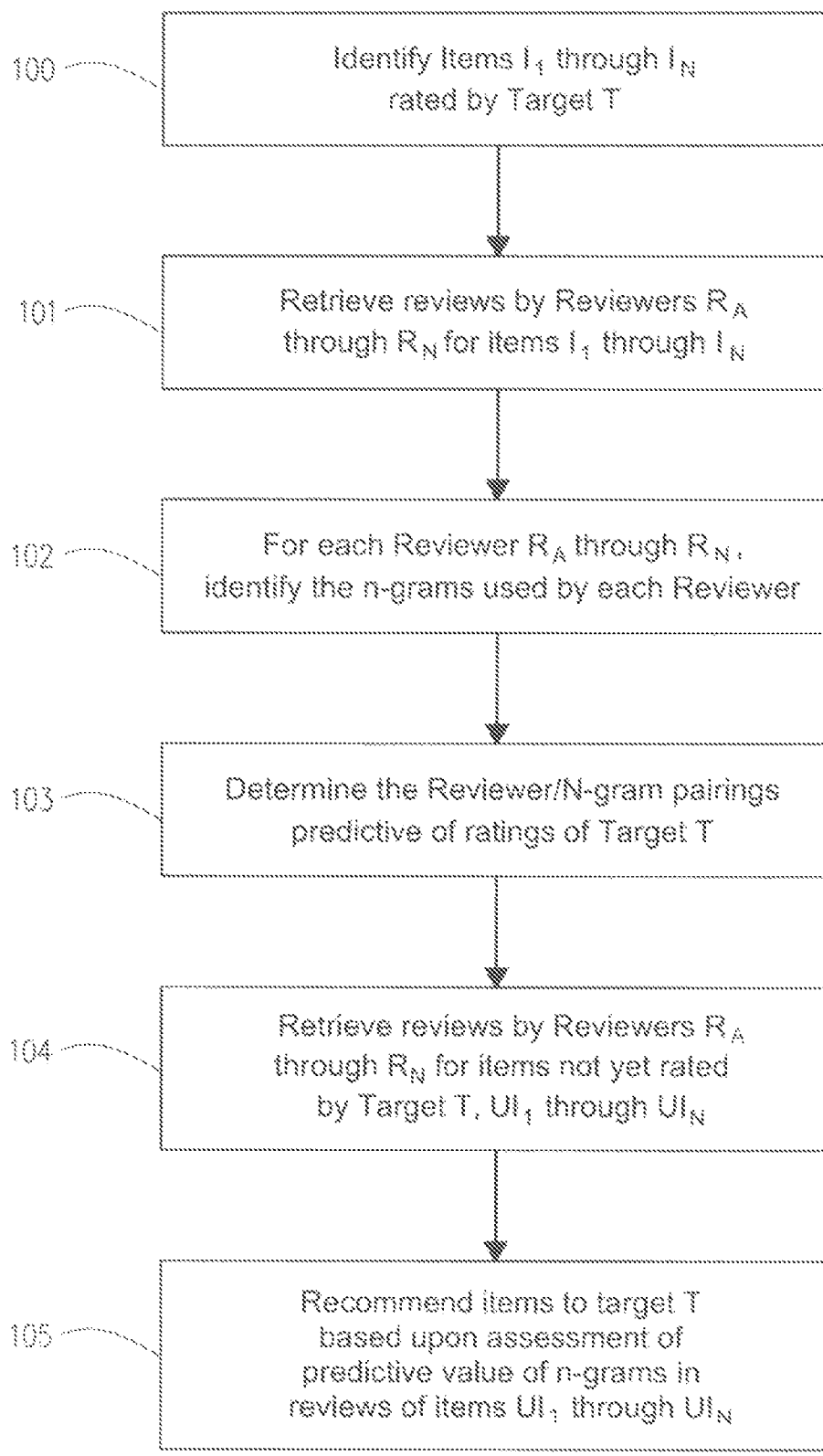
FIG. 3 is a simplified flowchart of an illustrative method for recommending products to a target user based upon the rating data of the target user and the reviews provided by reviewers.

A simplified block diagram of the computer-implemented system and method for recommending products to a target user based upon the rating history of a target user is depicted in FIG. 3. In Step 100, computing system 1000 first identifies a number of items, $I_1$ through $I_N$, that have been rated by Target T. In Step 101, computing system 1000 retrieves reviews by Reviewers $R_A$ through $R_N$ that have rated those items $I_1$ through $I_N$ rated by Target T. In Step 102, the System 1000 then identifies the unique n-grams used by each Reviewer. Although not depicted in FIG. 3, this Step 102 can include the additional steps of labeling each n-gram used by each reviewer with reviewer data, or by creating a unique identifier that reflects both the identity of the reviewer and the n-gram. For example, the first unique n-gram used by $R_A$ could be assigned the unique identifier NG1RA, while the second unique n-gram used by $R_A$ could be assigned the unique identifier NG2RA. Regardless of how the reviewer/n-gram pairings are identified, the System subsequently determines the value of the reviewer/n-gram pairings with respect to predicting the ratings of Target T in Step 103. In Step 104, the System 1000 retrieves reviews by Reviewers $R_A$ through $R_N$ for items $UI_1$ through $UI_N$ that have not yet been rated by Target T. In Step 105, the System 1000 recommends (or does not recommend) a selection from Items $UI_L$ through $UI_N$ based upon the presence or absence of predictive reviewer/n-gram pairings.

Figure 4A:
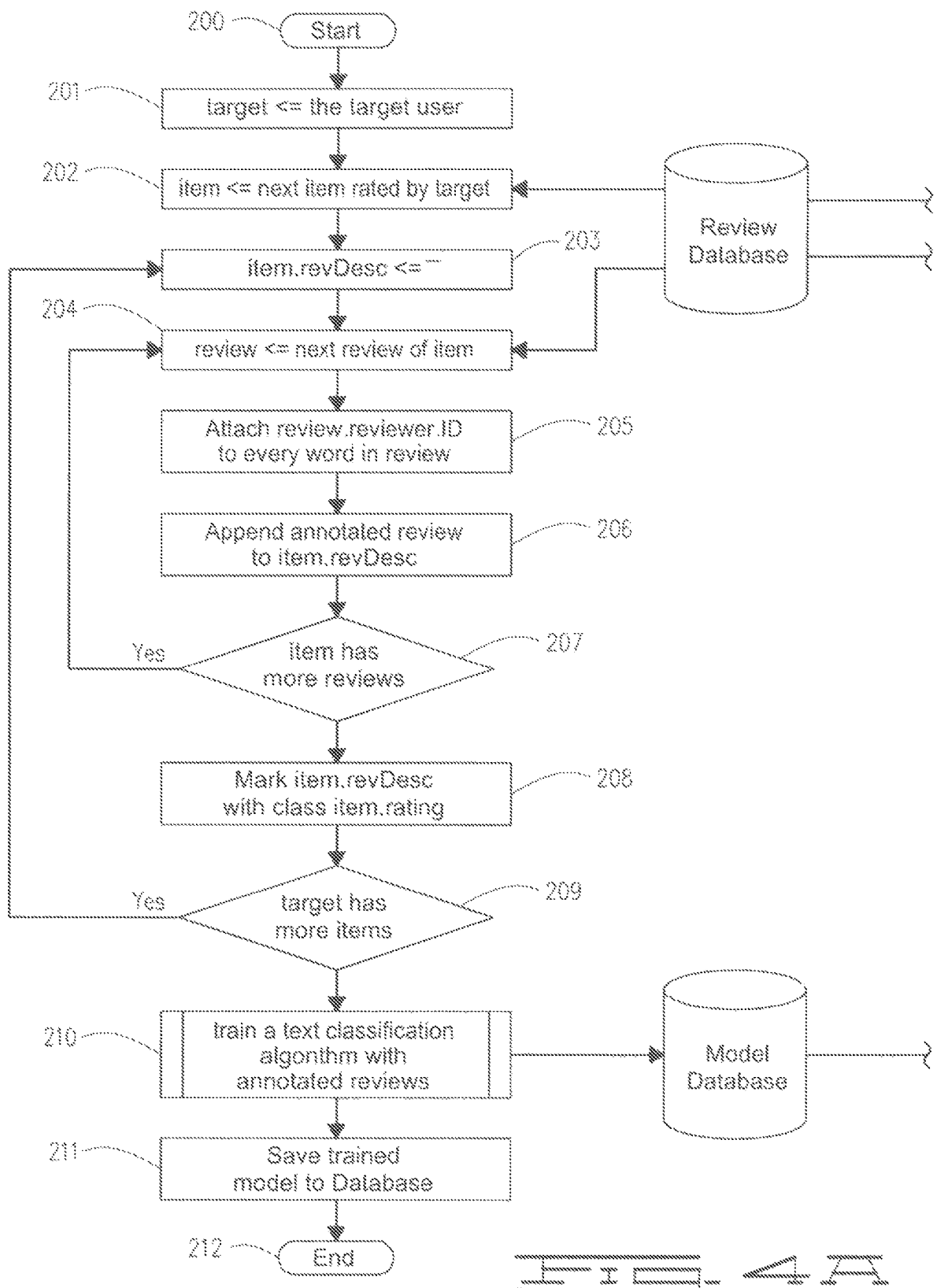
FIG. 4 illustrates one specific implementation of the sequence of steps in FIG. 3.
Figure 4B:
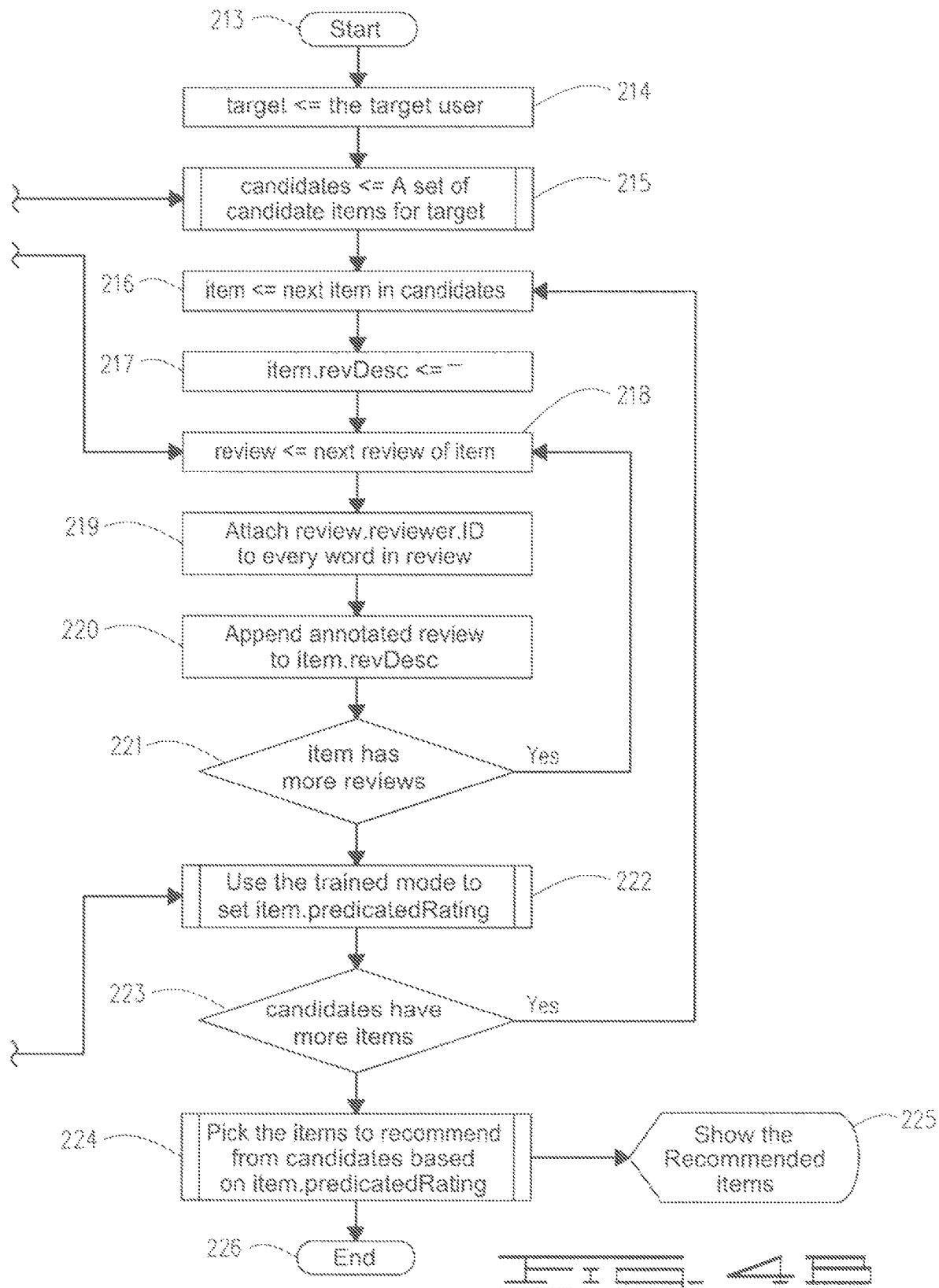

FIG. 4 is illustrative of the manner in which the steps set forth in FIG. 3 may be implemented. In this particular illustrative implementation, review data is collected and stored in a review database. Step 200 initiates the process of creating a trained model. At Step 201, a target user, Target T, is identified using any one of a variety of methods, including but not limited to self-selection or self-identification by the target user or the automatic detection that a target user is active on a particular website. At Step 202, the System 1000) identifies an item rated by Target T, and in Step 203, the System creates an empty string, identified in FIG. 4 as item.revDesc, for the first item so identified. In Step 204, the System 1000 identifies a first review of that item by a particular reviewer, and in Step 205, the System attaches a reviewer identification to every word in the first review. In Step 206, the annotated review is appended to the string associated with that item, e.g., the string identified as item.revDesc. In Step 207, the System 1000 determines whether additional reviews exist for the first identified item. If additional reviews exist, Steps 204, 205 and 206 are repeated for each additional review of the first identified item, with all annotated reviews being appended to the string associated with the item. e.g., the string identified as item.revDesc. When no more reviews for the item are detected, the System proceeds to Step 208, wherein the string is marked with the associated item rating provided by Target T. In Step 209, the System 1000 repeats Steps 203 through 208 for each additional item in the database rated by Target T. After all items rated by Target T have been processed, the System 1000 trains a text classification or prediction algorithm using the annotated reviews in Step 210. The training step can be accomplished using any one of a number of training algorithms known to those of skilled in the art, such as linear regression, neural networks, or Gaussian process. Additional existing classification or prediction approaches may also be used. The predictive model is then saved to a model database in Step 211, and the process of creating a trained model ends in Step 212. After a predictive model has been saved, the process of recommending a product to Target T may be initiated in Step 213. In Step 214, the target user, Target T, is identified, and, in Step 215, a file or list of candidate items (e.g., items not yet rated by Target T), is created. In Step 216, a candidate item is identified by the System 1000, and in Step 217 the System creates an empty string, e.g., the string identified as item.revDesc in FIG. 4, for the first candidate item so identified. In Step 218, the System 1000 identifies a first review of that item by a particular reviewer, and in Step 219, the System attaches a reviewer identification to every word in the first review. In Step 220, the annotated review is appended to the string associated with that item, e.g., the string identified as item.revDesc. In Step 221, the System 1000 determines whether additional reviews exist for the first identified candidate item. If additional reviews exist, Steps 218, 219, and 220 are repeated for each additional review of the first identified candidate item, with all annotated reviews being appended to the string associated with the item, e.g., the string identified as item.revDesc. When no more reviews for the first candidate item are detected, the System proceeds to Step 222, where the System 1000 uses the trained model and the data contained in the string identified as itemrevDesc for the first candidate item to determine a predicted rating for the first candidate item. In Step 223, the System 1000 repeats Steps 216 through 222 for each additional candidate item. At Step 224, the System 100X selects items to recommend based upon the predicted ratings for the candidate items, and displays the recommended items to Target T at Step 225. The recommendation process of Column B then ends at Step 226.

FIG. 6 is the programmatic illustration of the machine-learning regression algorithm, which was presented in FIG. 4.

The illustrative implementation described in FIG. 6 ("RWP") was analyzed and tested against competing algorithms, RegSVD, a popular rating-based recommendation system, and HFT, a widely acclaimed review-based system. The implementation was compared against these systems across six different online domains. It was determined that, for all six domains, the RWP implementation outperforms both the RegSVD and the HFT systems, having a lower Mean Absolute Error (MAE) and Root Mean Squared Error (RMSE) across all domains. Further, the RWP implementation is not affected by the size of the data set, e.g., when data from only 100 users are available as compared to when a much larger set of user data was available, to the same extent as other systems. The experimental calculated error rates for the RWP. RegSVD, and HFT systems are set forth below in Tables 2 and 3.

TABLE 2 comparative results of the implementation of FIG. 6, identified in the last column as RWP against competing algorithms for all ratings experiments.

|  | RegSVD | | HFT | | RWP | |
| --- | --- | --- | --- | --- | --- | --- |
|  | MAE | RMSE | MAE | RMSE | MAE | RMSE |
| Apps | 1.032 | 1.351 | 1.312 | 1.813 | 1.015 | 1.292 |
| Automotive | 1.702 | 2.081 | 1.262 | 1.804 | 0.630 | 0.944 |
| Baby | 1.037 | 1.340 | 1.243 | 1.710 | 0.893 | 1.186 |
| Beauty | 1.079 | 1.420 | 1.091 | 1.520 | 0.784 | 1.063 |
| Music | 0.757 | 1.022 | 0.864 | 1.231 | 0.683 | 0.948 |
| Goodreads | 1.015 | 1.396 | 0.818 | 1.093 | 0.775 | 1.034 |

TABLE 3 comparative results of the implementation of FIG. 6, identified in the last column as RWP against competing algorithms in 100 User Experiments.

|  | RegSVD | | HFT | | RWP | |
| --- | --- | --- | --- | --- | --- | --- |
|  | MAE | RMSE | MAE | RMSE | MAE | RMSE |
| Apps | 2.223 | 2.604 | 1.594 | 2.940 | 1.210 | 1.542 |
| Automotive | 2.323 | 2.682 | 1.559 | 2.070 | 0.634 | 0.994 |
| Baby | 2.842 | 3.100 | 1.190 | 1.550 | 0.801 | 1.096 |
| Beauty | 2.604 | 2.972 | 1.481 | 1.820 | 0.996 | 1.378 |
| Music | 2.086 | 2.472 | 1.136 | 1.670 | 0.643 | 0.919 |
| Goodreads | 2.128 | 2.472 | 1.207 | 1.687 | 0.926 | 1.249 |

FIG. 5 is another example of the manner in which the steps set forth in FIG. 3 may be implemented. In this particular illustrative implementation, Step 301 initiates the process of providing a product recommendation using a trained model. At Step 302, data is collected for a target user, including data pertaining to target identity, product identity, and rating data. At Step 303, data is collected for one or more reviewers, including reviewer identity, item identity, and review data. Because the two data sets are related only by items, it is understood that the rating data for a particular target user may be drawn from a variety of different online sources, so long as all such sources can be linked to the particular target user. Similarly, the data for a particular reviewer may be drawn from a variety of different online sources, so long as all such sources can be linked to the particular reviewer.

At Step 304, the data is divided into two sets: a training set and a weight calculation set. For example, 75% of the given ratings and reviews may be allocated to a training set, while the remaining 25% may be allocated to a weight calculation set. The exact allocation of the rating and review data may vary substantially.

At Step 305, the data from the training set is used to determine the n-grams for each reviewer that are predictive of the ratings provided by the target user using any one of a number of known machine-learning algorithms. By way of example only, the predictive value may be determined by first creating data points which consist of the reviews provided by every reviewer, each marked with the target user's rating for the corresponding item. These data points may then be converted into a feature vector, where the features are the words in the review, and the values are determined based upon any one of a number of known text mining approaches for determining the importance of the word in a document, such as Term Frequency-Inverse Document Frequency. A machine-learning regression algorithm, such as neural network, linear regression, Gaussian process, or any one of a number of other known machine-learning algorithms, may then be used to determine which n-grams used by a particular reviewer are predictive of the ratings provided by the target user, based upon the data in the training set. Significantly, the algorithm is conducted separately for each reviewer, so that the predictive value of the n-grams are determined not by the n-grams alone, but by taking into account both the n-grams and their affiliation with particular reviewers. For example, Agent A1 will find the common items among Reviewer A1 and the target user, and learn that certain words, word sequences, or other n-grams as used by Reviewer A1 are predictive of a particular rating by the target user; similarly, Agent A2 will find the common items among Reviewer A2 and the target user, and learn that different words, word sequences, or other n-grams as used by Reviewer A2 are predictive of a particular rating by the target user.

At Step 306, a trust value is determined for and assigned to each reviewer. The trust value for a particular reviewer may be calculated by utilizing the review data associated with the reviewer to predict the target user's rating for all each item in the weight calculation set. The trust value assigned to each reviewer will reflect ability of the reviewer's reviews to accurately predict the target user's ratings and the number of accurate predictions made by the reviewer. At Step 307, a predicted value is calculated for an item that has not yet been rated by the target user based upon the review data of one or more reviewers who have provided a review for the unrated item and the trust value associated with those reviewers. By way of illustration, the final predicted rating for an item Ix, rIx, may be calculated as follows:

$$r_{I_X} = \frac{\sum_{u \in Rev(I_X)} \text{Trust}(L_u) \times \text{Prediction}(L_u, I_X)}{\sum_{u \in Rev(I_X)} \text{Trust}(L_u)},$$

In this case, Rev(Ix) is the set of reviewers who have provided a review for Item IX, Trust(u) is the trust value for the reviewer, and Prediction(Lu, IX) is the prediction by Learner u, Lu for Item IX. Thus, in Step 307 each reviewer's model is used to predict the target user's rating. These predictions are combined using trust values to calculate the final predicted ratings for content not yet rated by the target user.

At Step 308, unrated items are ranked based upon the predicted ratings obtained in Step 307, and at Step 309, certain items are recommended to the target user based upon the rankings generated in Step 308. The process ends at Step 310.

FIG. 7 is a flowchart illustrating one method by which Steps 305 through 307 depicted in FIG. 5 may be carried out. In this illustration, the System 1000 identifies three Reviewers, identified as Source 1 (S1), Source 2 (S2) and Source 3 (S3), and identifies n-grams associated with each reviewer. An agent constructed for each reviewer (A1, A2, and A3, respectively) determines the items commonly reviewed by the Target User and the corresponding Reviewer, and learns that certain words, word sequences, or other n-grams as used by the corresponding Reviewer are predictive of the ratings provided by the Target User. The System 1000 then constructs a Learner for each of the three Reviewers (Learner A1, Learner A2, and Learner A3, respectively), each of which determine a trust value for the corresponding Reviewer by utilizing the review data associated with the Reviewer in the weight calculation set to predict the ratings of the Target User contained in the weight calculation set. An ensembler then projects a rating for unreviewed products based upon the ratings of the Reviewers and the calculated trust values for the Reviewers, and relays that projection to the Target User.

The illustrative implementation ("LIRA") described in FIG. 5 was analyzed and tested against competing algorithms, RegSVD, a popular rating-based recommendation system, and HFT, a widely acclaimed review-based system. The implementation was compared against these systems across six different online domains. It was determined that, for all six domains, the LIRA implementation outperforms both the RegSVD and the HFT systems, having a lower Mean Absolute Error (MAE) and Root Mean Squared Error (RMSE) across all domains. Further, the LIRA implementation is not affected by the size of the data set, e.g., when data from only 100 users are available as compared to when a much larger set of user data was available, to the same extent as other systems. The experimental calculated error rates for the LIRA, RegSVD, and HFT systems are set forth below in Tables 4 and 5.

TABLE 4

Results of LIRA against Competing Algorithms, All Ratings Experiment

| | RegSVD | | HFT | | LIRA | | |
|---|---|---|---|---|---|---|---|
| | MAE | RMSE | MAE | RMSE | MAE | RMSE | Coverage |
| Apps | 1.032 | 1.351 | 1.312 | 1.813 | 0.919 | 1.152 | (0.74) |
| Automotive | 1.702 | 2.081 | 1.262 | 1.804 | 0.632 | 0.944 | (0.78) |
| Baby | 1.037 | 1.340 | 1.243 | 1.710 | 0.867 | 1.111 | (0.82) |
| Beauty | 1.079 | 1.420 | 1.091 | 1.520 | 0.843 | 1.120 | (0.81) |
| Music | 0.757 | 1.022 | 0.864 | 1.231 | 0.655 | 0.958 | (0.98) |
| Goodreads | 1.015 | 1.396 | 0.818 | 1.093 | 0.748 | 0.963 | (0.86) |

TABLE 5

Results of LIRA against Competing Algorithms, 100 User Experiment

|  | RegSVD | | HFT | | LIRA | | |
| --- | --- | --- | --- | --- | --- | --- | --- |
|  | MAE | RMSE | MAE | RMSE | MAE | RMSE | Coverage |
| Apps | 2.223 | 2.604 | 1.594 | 2.940 | 1.034 | 1.384 | (0.76) |
| Automotive | 2.323 | 2.682 | 1.559 | 2.070 | 0.677 | 0.998 | (0.80) |
| Baby | 2.842 | 3.100 | 1.190 | 1.550 | 0.814 | 1.177 | (0.87) |
| Beauty | 2.604 | 2.972 | 1.481 | 1.820 | 0.939 | 1.172 | (0.83) |
| Music | 2.086 | 2.472 | 1.136 | 1.670 | 0.601 | 0.886 | (0.98) |
| Goodreads | 2.128 | 2.472 | 1.207 | 1.687 | 0.790 | 1.024 | (0.84) |

As will be understood to one skilled in the art, the detailed implementations set forth herein include optional steps that will not be necessary in every implementation. For example, the step of storing data in a database will not be necessary in a dynamic implementation that obtains data directly from online review and ratings data. Similarly, the step of filtering out low-value n-grams will not necessarily be used in a language-independent implementation, but may be used in a language-specific implementation in order to optimize speed and efficiency.

Although certain steps are described herein and illustrated in the figures as occurring sequentially, some steps may occur simultaneously with each other or in an order that is not depicted. The present disclosure of the disclosed system, methods, techniques, and functions are not to be limited to the precise descriptions and illustrations. Other embodiments will be apparent to one skilled in the art. As such, the foregoing description merely enables and describes the general uses of the described system and method. While certain embodiments of the system and method have been described for the purpose of this disclosure, those skilled in the art can make changes without departing from the spirit and scope thereof. Thus, the appended claims define what is claimed.

What is claimed is:

1. A computer-implemented method for recommending content to a target user, the method being performed by one or more processors, the method comprising the steps of:
   (a) identifying a target user;
   (b) identifying a set of data, said set of data including at least:
      (i) a rating by said target user for a rated product,
      (ii) a review by a reviewer for said rated product,
      (iii) a review by said reviewer for an unrated product, and
      (iv) an identity of said reviewer;
   (c) for said rated product:
      (i) identifying one or more n-grams contained in said review by said reviewer, and
      (ii) linking said one or more of said n-grams identified in step (c)(i) with said identity of said reviewer who provided said review containing said n-grams;
   (d) after step (c), training a classification or prediction model using the data linked in step (c) and said rating by said target user for said rated product; and
   (e) after step (d), determining a predicted rating for said unrated product wherein said classification or prediction model determines said predicted rating for said unrated product based upon the presence of said one or more n-grams in said review by said reviewer of said unrated product.

2. The method of claim 1, wherein identifying a set of data further comprises:
   (a) searching one or more repositories for data pertaining to said target user, said reviewer, rated product, and/or said unrated product.

3. The method of claim 1, wherein identifying a target user further comprises:
   (a) selecting a target user who has provided a rating for a rated product.

4. The method of claim 1, further comprising:
   (a) after at least step (b), identifying a reviewer who has provided at least one review of said rated product and at least one review of said unrated product.

5. The method of claim 1, further comprising:
   (a) after at least step (b), filtering said set of data to exclude data pertaining to a reviewer who has not provided a review for said unrated product.

6. The method of claim 1, further comprising:
   (a) after at least step (a) of step 1, filtering said set of data to exclude data pertaining to a reviewer who has not provided a review for said unrated product.

7. The method of claim 1, further comprising:
   (a) storing said set of data in a first review database stored on storage media.

8. The method of claim 1, further comprising:
   (a) after at least step (c), filtering said one or more n-grams to exclude one or more n-grams with a low predictive value.

9. The method of claim 1, further comprising:
   (a) saving the classification or prediction model to a database.

10. The method of claim 1, further comprising:
    (a) after at least step (e), providing a recommendation concerning said unrated product to said target user based upon said predicted rating for said unrated product.

11. The method of claim 10, further comprising:
    (a) communicating said recommendation to said target user.

12. The method of claim 1, wherein linking one or more of said n-grams identified in step (c)(i) with said identity of said reviewer who provided said review containing said n-grams further comprises:
    (a) assigning one or more unique identifiers to said one or more of said n-grams used by said reviewer, wherein each said unique identifier reflects both (i) at least one of said n-grams contained in said review; and (ii) said identity of said reviewer who provided said review.

13. The method of claim 12, further comprising:
    (a) filtering said one or more unique identifiers to select the most predictive unique identifiers.

14. The method of claim 1, wherein said classification model is language-independent.

15. The method of claim 1, wherein said classification model is grammar-independent.

16. The method of claim 1, wherein linking one or more of the n-grams identified in step (c)(i) to said identity of said reviewer who provided said review containing said n-grams further comprises:
    (a) creating at least one unique data set, wherein said unique data set reflects at least said identity of said user and at least one of the n-grams identified in step (c)(i).

17. A computer-implemented method for predicting a target user's rating of unrated content, the method being performed by one or more processors configured with executable instructions, the method comprising the steps of:
(a) identifying a target user;
(b) identifying a reviewer who has provided at least one review for a rated product rated by said target user;
(c) identifying a set of data, said set of data including at least:
 (i) a rating by said target user for said rated product,
 (ii) a review by said reviewer for said rated product,
 (iii) a review by said reviewer for an unrated product, and
 (iv) an identity of said reviewer;
(d) for said review of said rated product:
 (i) identifying one or more n-gram(s) contained in said review by said reviewer, and
 (ii) linking said one or more n-grams with said identity of said reviewer who provided said review;
(e) training a classification algorithm associated with said target user by linking said rating by said target user of said rated product with the data linked in step (d);
(f) using said classification algorithm to determine a predicted rating of said target user for said unrated product wherein the said classification algorithm determines said predicted rating of said target user for said unrated item based upon the presence of said one or more n-grams in said review by said reviewer of said unrated product.

18. The method of claim 17, wherein identifying a set of data further comprises:
(a) searching one or more repositories for data pertaining to said target user, said reviewer, said rated product, and/or said unmated product.

19. The method of claim 17, wherein identifying a target user further comprises:
(a) selecting a target user who has provided a rating for a rated product.

20. The method of claim 17, further comprising:
(a) identifying a reviewer who has provided at least one review for said rated product and at least one review for said unrated product.

21. The method of claim 17, further comprising:
(a) filtering said set of data to exclude data pertaining to a reviewer who has not provided a review for said unrated product.

22. The method of claim 17, further comprising:
(a) storing said set of data in a first review database stored on storage media.

23. The method of claim 17, further comprising:
(a) filtering said one or more n-grams to exclude one or more n-grams with a low predictive value.

24. The method of claim 17, further comprising:
(a) saving said trained classification algorithm to a database.

25. The method of claim 17, further comprising:
(a) providing a recommendation concerning said unrated product to said target user based upon said predicted rating for said unrated product.

26. The method of claim 25, further comprising:
(a) communicating said recommendation to said target user.

27. The method of claim 17, wherein linking said one or more n-grams with said identity of said reviewer further comprises:
(a) assigning one or more unique identifiers to said one or more n-grams used by said reviewer.

28. The method of claim 27, further comprising:
(a) filtering said one or more unique identifiers to select the most predictive unique identifiers.

29. The method of claim 17, wherein linking said one or more n-grams with said identity of said reviewer who provided said review further comprises:
(a) creating at least one unique data set, wherein said unique data set reflects at least said identity of said user who provided said review and at least one of the n-grams identified in step (d)(ii).

30. A computer-implemented method for recommending content to a target user, the method being performed by one or more processors, the method comprising the steps of:
(a) identifying a target user;
(b) identifying a set of data, said set of data including at least:
 (i) a rating by said target user for a rated product,
 (ii) a first review by a first reviewer for said rated product,
 (iii) a second review by a second reviewer for said rated product,
 (iv) at least one of:
  1. a review by said first reviewer for a product that is unrated by said target user, or
  2. a review by said second reviewer for a product that is unrated by said target user,
 (v) an identity of said first reviewer, and
 (vi) an identity of said second reviewer;
(c) for said rated product:
 (i) identifying one or more n-grams contained in said first review by said first reviewer for said rated product, and
 (ii) linking one or more of the n-grams identified in step (c)(i) with said identity of said first reviewer;
(d) for said rated product:
 (i) identifying one or more n-grams contained in said second review by said second reviewer of said rated product, and
 (ii) linking one or more of the n-grams identified in step (d)(i) with said identity of said second reviewer;
(e) after steps (c) and (d), training a classification or prediction model using the data linked in steps (c) and (d) and said rating by said target user for said rated product; and
(f) after step (e), determining a predicted rating for said unrated product wherein said classification or prediction model determines said predicted rating for said product that is unrated by said target user based upon at least one of:
 (i) the presence of one or more n-grams identified in step (c)(1) in a review by said first reviewer for said product that is unrated by said target user, or
 (ii) the presence of one or more n-grams identified in step (d)(1) in a review by said second reviewer for said product that is unrated by said target user.

31. The method of claim 30, further comprising:
(a) for said first review by said first reviewer for said rated product, creating at least one unique data set, wherein said unique data set reflects at least said identity of said first reviewer and at least one of said n-grams used by said first reviewer as identified in step (c)(1); and (b) for said second review by said second reviewer for said rated product, creating at least one unique data set, wherein said unique data set reflects at least said identity of said second reviewer and at least one of said n-grams used by said second reviewer as identified in step (d)(1).

* * * * *